United States Patent [19]
Taniguchi et al.

[11] Patent Number: 5,846,152
[45] Date of Patent: Dec. 8, 1998

[54] CONTINUOUSLY VARIABLE TRANSMISSION

[75] Inventors: Takao Taniguchi; Shoichi Miyagawa, both of Okazaki; Kazumasa Tsukamoto, Toyota; Shiro Sakakibara, Anjo; Takeshi Inuzuka, Anjo; Masashi Hattori, Anjo; Takao Terashima, Anjo, all of Japan

[73] Assignee: Aisin Aw Co., Ltd., Japan

[21] Appl. No.: 755,474

[22] Filed: Nov. 22, 1996

[30] Foreign Application Priority Data

Nov. 24, 1995 [JP] Japan .................................. 7-306155

[51] Int. Cl.⁶ .................................................. F16H 37/02
[52] U.S. Cl. .......................... 475/210; 475/211; 475/212
[58] Field of Search .................................. 475/210, 211, 475/214, 215, 231, 213, 212, 331, 204; 74/477

[56] References Cited

U.S. PATENT DOCUMENTS

| | | | |
|---|---|---|---|
| 3,340,749 | 9/1967 | Magg | 74/689 |
| 3,850,050 | 11/1974 | Lemmens | 475/211 X |
| 4,290,320 | 9/1981 | Abbott . | |
| 4,402,237 | 9/1983 | Tomlinson . | |
| 4,539,866 | 9/1985 | Koivunen | 475/210 |
| 4,543,852 | 10/1985 | Svab et al. | 475/210 |
| 4,553,450 | 11/1985 | Gizard . | |
| 4,589,303 | 5/1986 | Roberts | 475/211 |
| 4,644,820 | 2/1987 | Macey et al. . | |
| 4,784,018 | 11/1988 | Okada et al. | 475/210 X |
| 4,950,213 | 8/1990 | Morisawa | 475/210 X |
| 5,052,990 | 10/1991 | Sakakibara et al. | 475/210 |
| 5,183,444 | 2/1993 | Robbins | 475/210 |
| 5,203,233 | 4/1993 | Hattori | 75/865 |
| 5,292,290 | 3/1994 | Scholz et al. | 475/231 |

FOREIGN PATENT DOCUMENTS

| | | |
|---|---|---|
| 64678 | 11/1982 | European Pat. Off. . |
| 733829 | 9/1996 | European Pat. Off. . |
| 6331000 | 11/1994 | Japan . |
| 1603633 | 11/1981 | United Kingdom . |

Primary Examiner—Richard M. Lorence
Assistant Examiner—Marcus Charles
Attorney, Agent, or Firm—Lorusso & Loud

[57] ABSTRACT

A transmission unit includes a belt type continuously variable transmission (CVT) having a first pulley arranged on a first shaft with a stationary sheave, a movable sheave and a hydraulic actuator for the movable sheave. The second pulley of the CVT is mounted on a second shaft and also has a stationary sheave, a movable sheave and a hydraulic actuator. A belt is mounted around the first and second pulleys. The transmission unit further includes a synchronous transmission for connecting a first rotary member arranged on the first shaft and a second rotary member arranged on the second shaft at a constant speed ratio, an output gear for transmitting power to the wheels and a planetary gear unit. The planetary gear unit is mounted on the second shaft and includes at least first, second and third rotary elements. The first rotary element is connected to the second rotary member, the second rotary element to the second pulley, and the third rotary element to the output gear. The first shaft is connected through the CVT to the second rotary element and through the synchronous transmission to the first rotary element. The hydraulic actuators are arranged on opposite sides of the belt.

9 Claims, 6 Drawing Sheets

Clutch Application Table

| Range | | $C_L$ | $C_H$ |
|---|---|---|---|
| P | | | |
| R | | ○ | |
| N | | | |
| D | Low | ○ | |
| | High | | ○ |

FIG. 5

FIG. 6

CONTINUOUSLY VARIABLE TRANSMISSION

BACKGROUND OF THE INVENTION

1. Field of the Invention

The invention relates to a belt type continuously variable transmission, in which a belt runs between primary and secondary pulleys, each having two sheaves and, more particularly, to an arrangement/construction of a transmission combining the belt type continuously variable transmission, a synchronous transmission and a planetary gear unit.

2. Related Art

In recent years, automatic transmission units including the belt type continuously variable transmission have received attention from the viewpoint of improvement in fuel consumption and in driveability.

One prior art transmission combining a belt type continuously variable transmission, a synchronous transmission, and a planetary gear unit has a low clutch for changing the speed, including changes from 0 RPM, with torque circulation through the planetary gear unit, and a high clutch for actuating only the belt-type continuously variable transmission, so that a non-stage speed change from the reverse gear stage to the high forward gear stage can be provided, as disclosed in Japanese Laid-Open Application Nos. 188841/1987 and 331000/1994.

In such a transmission unit, the belt type continuously variable transmission, the synchronous transmission, the planetary gear unit, the low clutch and the high clutch are arranged on first and second shafts so as not to overlap one another in the axial direction. The belt type continuously variable transmission, in particular, is axially elongated to accommodate a relatively long hydraulic actuator arranged on the back of each of the movable sheaves of the primary and the secondary pulleys, so that an axially elongated mounting stage is required overall, which elongated axial dimension can be accommodated only with difficulty in the mounting space of the typical F/F (i.e., front engine/front wheel drive) vehicle.

SUMMARY OF THE INVENTION

It is, therefore, an object of the present invention to provide a continuously variable transmission which has a compact structure, especially an axially compact structure.

Another object of the present invention is solution of the above-described prior art problems by making more effective use of space to accommodate the aforementioned relatively long hydraulic actuator.

Accordingly, the present invention provides a transmission including a belt type continuously variable transmission, a synchronous transmission, a planetary gear unit and an output gear for transmitting output torque to the wheels.

The belt type continuously variable transmission subunit includes a first pulley arranged on a first shaft, a second pulley arranged on a second shaft and a belt around the first and second pulleys. Each of the pulleys includes a stationary sheave, a movable sheave and a hydraulic actuator arranged at the back of the movable sheave.

The synchronous transmission subunit provides a torque path, connecting a first rotary member arranged on the first shaft and a second rotary member arranged on the second shaft, at a constant speed ratio.

The planetary gear subunit is arranged on the second shaft and includes at least first, second and third rotary elements, the first rotary element being connected to the second rotary member, the second rotary element being connected to the second pulley, and the third rotary element being connected to the output gear.

The first shaft is connected through the continuously variable transmission to the second rotary element and through the synchronous transmission to the first rotary element.

The hydraulic actuator of the first pulley and the hydraulic actuator of the second pulley are axially offset from each other on opposite sides of the belt.

The planetary gear subunit and the output gear are arranged to axially overlap the hydraulic actuator of the first pulley on the second shaft between the synchronous transmission and the second pulley.

The power from the engine is output directly to the first shaft through a damper unit for absorbing the fluctuation of the torque of the engine, and the damper unit axially overlaps the hydraulic actuator of the second pulley and is located on the engine side of the stationary sheave of the first pulley.

An oil pump, driven by the power of the engine to produce an oil pressure feed to the hydraulic actuators of the first and second pulleys, is arranged on the first shaft between the damper unit and the stationary sheave of the first pulley.

A first clutch is interposed between the first shaft and the first rotary member of the synchronous transmission for selectively transmitting the torque and includes an input side member mounted on the first shaft axially outboard of the first rotary member.

The synchronous transmission includes sprockets serving as the first and second rotary members, respectively, and a chain which runs around the two sprockets.

The planetary gear unit is preferably a simple planetary gear unit wherein the first rotary element is a carrier, the second rotary element is a sun gear, and the third rotary element is a ring gear.

A second clutch is interposed between the sun gear and the ring gear for selectively transmitting the torque and is mounted on the said second shaft between the planetary gear unit and the output gear.

The hydraulic actuators of the first and second pulleys each have first oil chambers and second oil chambers arranged axially in series for operation of the respective movable sheaves.

Figure 2:
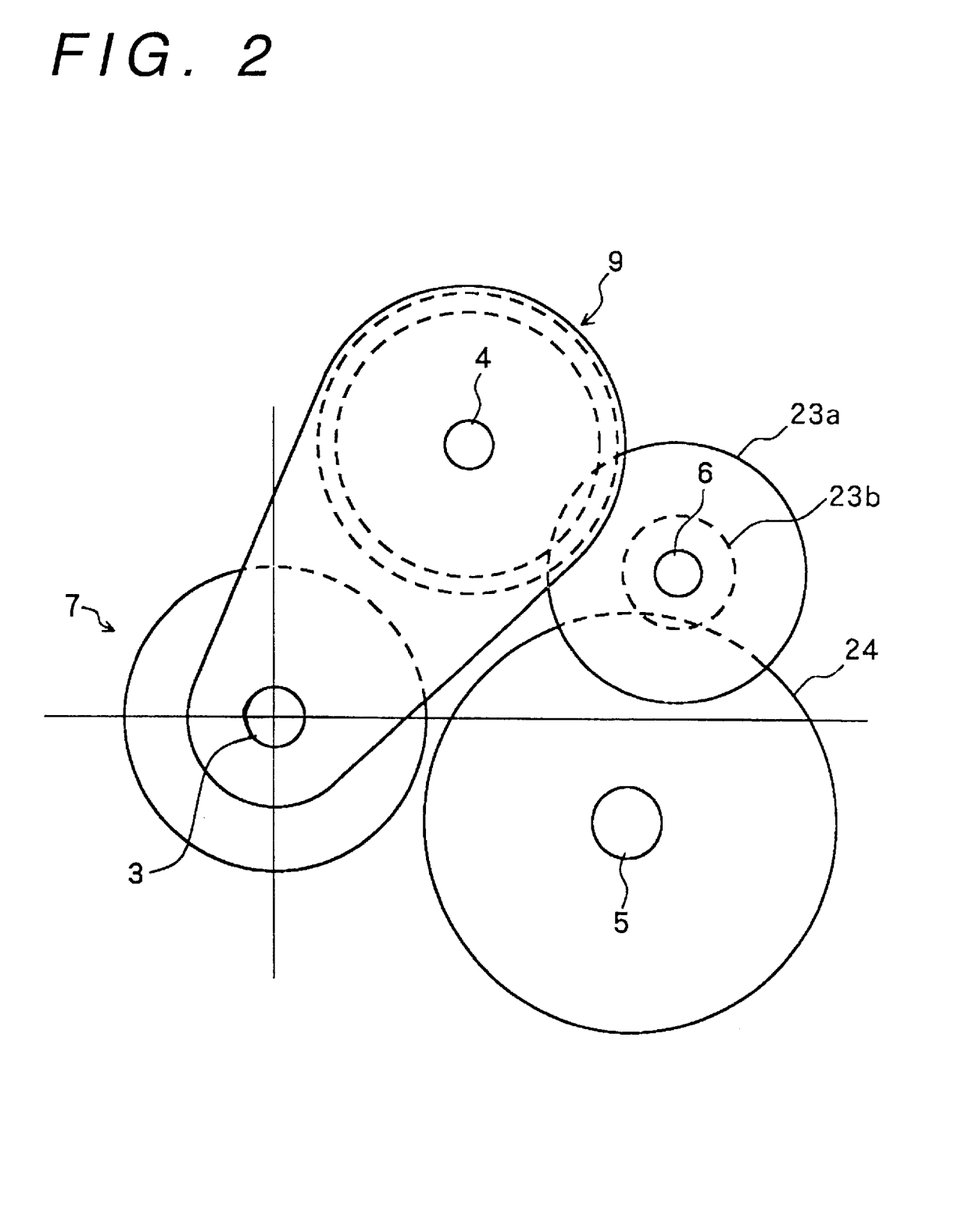
FIG. 2 is a side elevation of the embodiment of FIG. 1.

The transmission unit of the present invention further includes a differential unit, a third shaft extending from the differential unit as left and right front wheel axles, and a fourth shaft (counter shaft) interposed between the output gear and the differential unit. As seen in FIG. 2, lines joining the centers of the first, second, third and fourth shafts form a deformed quadrilateral. As seen in side elevation, in order from the uppermost to the lowest, are the second shaft, the fourth shaft, the first shaft and the third shaft.

In the present invention, the boss portion of the stationary sheave of the second pulley is rotatably supported by the casing through a bearing and the output gear is rotatably supported on the boss portion of said stationary sheave through a bearing.

In the low gear mode, in which the first clutch is applied whereas the second clutch is released, the rotation of the first shaft (or input shaft), as transmitted from the engine through the damper, is transmitted through the belt type continuously variable transmission (CVT) to the second rotary element (or sun gear) of the planetary gear unit on the second shaft and through the first clutch and the synchronous transmission to the first rotary element (or carrier) of the planetary gear unit. Moreover, the torques input through the first rotary element and the second rotary element are integrated in the planetary gear unit and output from the third rotary element (or ring gear) to the output gear. Torque circulation is established so that the rotation of the output gear is speed-changed and switched from forward to reverse across neutral in accordance with the speed change of the CVT. By setting the difference between the axial forces of the two hydraulic actuators of the first pulley and the second pulley within a predetermined range, the speed ratio of the CVT automatically converges to establish the neutral state in which the rotation of the output gear is 0.

In the high gear mode in which the first clutch is released whereas the second clutch is applied, on the other hand, the rotation of the first shaft is transmitted through the CVT to the second shaft and further through the planetary gear unit, as integrally rotated by the application of the second clutch, to the output gear. The rotational speed of the output gear is changed by suitably changing the speed of the CVT.

While the nature of the first, second and third shafts is not especially limited, in the preferred embodiment the first shaft includes the shaft and the stationary sheave of the first pulley and the second shaft includes the stationary sheave of the second pulley.

BRIEF DESCRIPTION OF THE DRAWINGS

The invention will be described with reference to the drawings in which.

DESCRIPTION OF THE PREFERRED EMBODIMENTS

Figure 1:
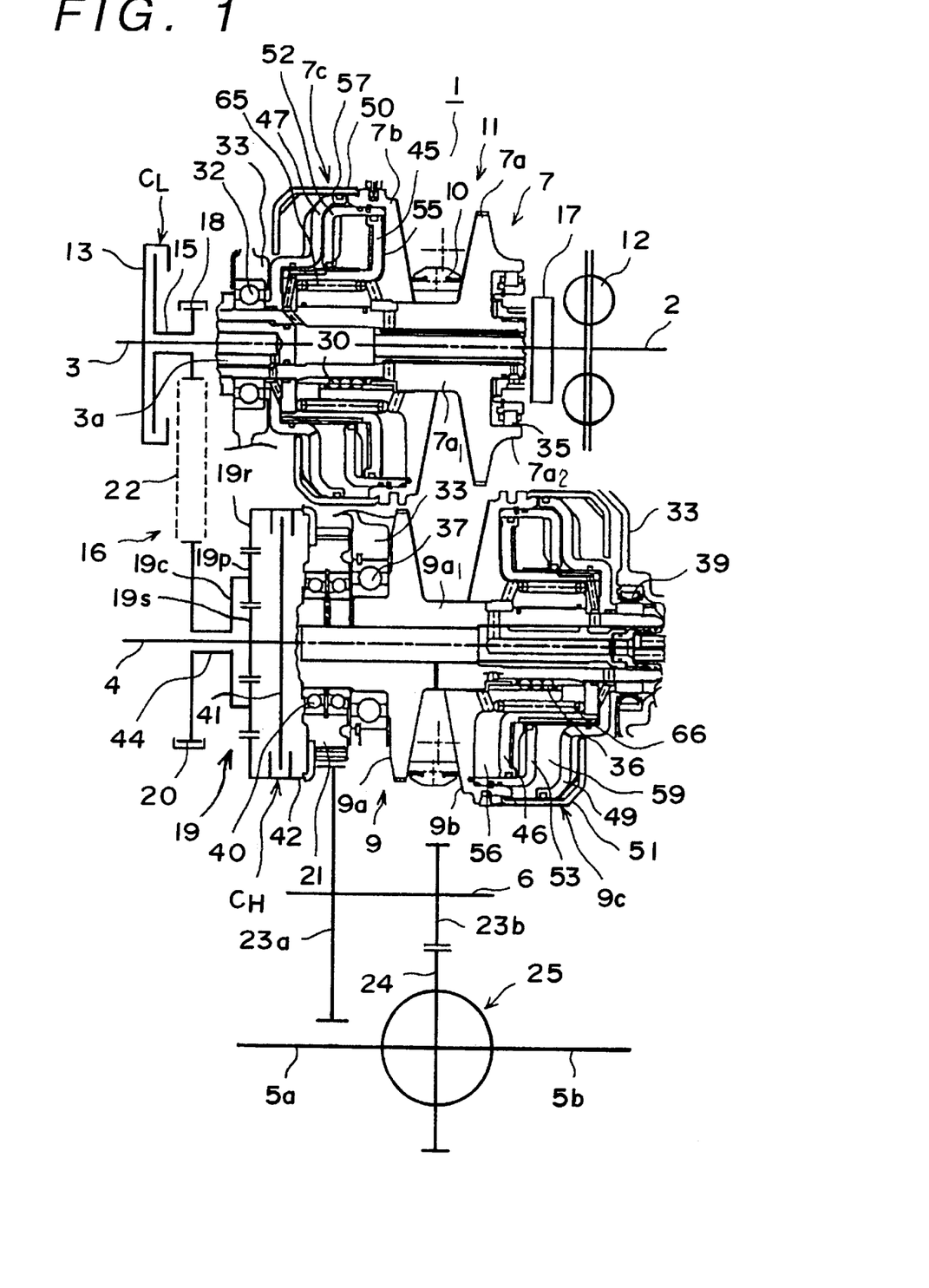
FIG. 1 is a sectional front elevation of an embodiment according to the present invention.

As the terms are used herein, "rear" has reference to the engine side (right side of FIG. 1) and "front" has reference to the opposite side (left side of FIG. 1).

Preferred embodiments of the present invention will now be described with reference to the accompanying drawings. As shown in FIGS. 1 and 2 a vehicular automatic continuously variable transmission 1 includes a first shaft 3 aligned with an engine crankshaft 2, a second shaft 4, a third shaft 5 (5a and 5b) serving as a front axle, and a fourth shaft 6 serving as a counter shaft. A primary (or first) pulley 7 is arranged on the first shaft 3, and a secondary (or second) pulley 9 is arranged on the second shaft 4. A belt 10 is mounted for travel around these two pulleys 7 and 9.

The first (input) shaft 3 is connected directly to the engine crankshaft 2 through a damper unit 12 for absorbing the torque fluctuation of the engine, and this input shaft 3 carries primary pulley 7, inclusive of a stationary sheave 7a and a movable sheave 7b, and has a shaft 3a splined to the boss portion $7a_1$ of the stationary sheave 7a. Portion 3a of the input shaft 3 is fixed to an input side member 13 of a low clutch $C_L$, and rotatably supports output side member 15 of the low clutch $C_L$. To this output side member 15 is integrally connected a primary side sprocket 18 which constitutes part of a synchronous transmission 16. An oil pump 17 is connected to the stationary sheave 7a of the primary pulley 7, and movable sheave 7b is slidably supported by the stationary sheave 7a for positioning by hydraulic actuator 7c.

The second shaft 4 has fixed thereto a stationary sheave 9a of the secondary pulley 9 which slidably supports a movable sheave 9b for positioning by a hydraulic actuator 9c. Also arranged on the second shaft 4 are a high clutch $C_H$ and a planetary gear unit 19. Moveover, the second shaft 4 rotatably supports a secondary side sprocket 20, forming part of synchronous transmission 16, and an output gear 21.

The planetary gear unit 19 is a single pinion planetary gear unit which has a sun gear 19s, a ring gear 19r, and a carrier 19c rotatably supporting a pinion 19p meshing with those two gears. Moreover, the sun gear 19s is connected to the stationary sheave 9a of the secondary pulley 9 to serve as the second rotary element; the ring gear 19r is connected to the output gear 21 to serve as the third rotary element; and the carrier 19c is connected to the secondary side sprocket 20 to serve as the first rotary element. Around the primary and secondary side sprockets 18 and 20 is arranged an endless member 22 such as a chain, e.g., a roller chain or a timing belt. The high clutch $C_H$ is interposed between the sun gear 19s and the ring gear 19r.

The output gear 21 meshes with a larger gear 23a mounted on the counter shaft 6 (the fourth shaft), and a relatively smaller gear 23b, also mounted on the counter shaft 6, meshes with a ring gear 24 of a differential unit 25. This differential unit 25 outputs differential rotations individually to the left and right axles 5a and 5b which together constitute the third shaft.

The boss portion $7a_1$ of the stationary sheave 7a of the primary pulley 7 slidably supports the movable sheave 7b for axial sliding movement thereon through a ball spline 30. At the back of this movable sheave 7b is arranged the hydraulic actuator 7c. The boss portion $7a_1$, which is located at the engine side of the actuator 7c, in turn, is rotatably supported through a (ball) bearing 32 on case 33. The stationary sheave 7a has on its engine side a flange portion $7a_2$1 which rotatably supports the stationary sheave 7a at its inner circumference through a (roller) bearing 35. As a result, the primary pulley 7 is supported between the two bearings 32 and 35.

On the first shaft 3 is mounted the oil pump 17 which is interposed between the damper unit 12 and the stationary sheave 7a of the primary pulley 7. The primary side sprocket 18 of the synchronous transmission 16 is arranged on the side of the bearing 32 opposite the primary pulley. The low clutch $C_L$ is arranged at the front end side of the sprocket 18. Thus, arranged on the first shaft 3, are the damper unit 12, the oil pump 17, the stationary sheave 7a, the movable sheave 7b and the hydraulic actuator 7c of the primary pulley 7, the bearing 32, the primary side sprocket 18 and the low clutch $C_L$, in the consecutive order recited, coaxially with the engine crankshaft 2 (front end side of the engine).

The boss portion 9a of the stationary sheave 9a of the secondary pulley 9 slidably supports the moveable sheave 9b which is axially slidable thereon through a ball spline 36 and which is abutted by the hydraulic actuator 9c. A (ball) bearing 37 is mounted around the outer circumference of the boss portion at the backside of the stationary sheave 9a, and a (roller) bearing 39 is mounted on outer circumference of the boss portion on the engine side of the hydraulic actuator 9c. The secondary pulley 9 is supported on the case 33 between the bearings 37 and 39. Thus, the primary pulley 7 and the secondary pulley 9 are inverted relative to each other in terms of the relative axial positions of their stationary and movable sheaves. In the secondary pulley 9, therefore, the movable sheave 9b and its hydraulic actuator 9c are located at engine (rear) side, and the stationary sheave 9a is on its front end side.

The second shaft 4 rotatably supports the output gear 21 through a (ball) bearing 40 at the front end side of the bearing 37 of the stationary sheave 9a. At the front end side of the output gear 21 is mounted the high clutch $C_H$ which includes an input side member 41, fixed on the stationary sheave 9a of the secondary pulley 9 which forms the second shaft 4, and an output side member 42 fixed on the output gear 21. Further, at the front end on the second shaft 4 is arranged the planetary gear unit 19 and, yet further toward its front end, second shaft 4 rotatably supports a hollow intermediate shaft 44 which connects the secondary side sprocket 20 of the synchronous transmission 16 and the carrier 19c of the planetary gear unit 19. Thus, on the second shaft 4, there are arranged the hydraulic actuator 9c, the movable sheave 9b, the stationary sheave 9a, the output gear 21, the high clutch $C_H$, the planetary gear 19, and the secondary side sprocket 20 of the synchronous transmission, in consecutive order coaxially from the engine end side toward the front end.

On the other hand, the hydraulic actuators 7c and 9c of the primary pulley 7 and the secondary pulley 9 are individually equipped with partition members 45 and 46 and cylinder members 47 and 49 fixed on the stationary sheave boss portions $7a_1$ and $9a_1$, and drum members 50 and 51 and second piston members 52 and 53 fixed on the backs of the movable sheaves 7b and 9b. The partition members 45 and 46 are fitted oil-tight on the second piston members 52 and 53, which in turn are fitted oil-tight on the cylinder members 47 and 49 and the partition members 45 and 46, to provide a double-piston structure composed of first oil pressure chambers 55 and 56 and second oil pressure chambers 57 and 59.

In the first oil pressure chambers 55 and 56 in the hydraulic actuators 7c and 9c, the backs of the individual movable sheaves 7b and 9b serve as piston faces, the effective pressure receiving areas being equal at the primary side and at the secondary side. The primary and secondary side stationary sheave boss portions $7a_1$ and $9a_1$ are each provided with oil passages communicating with the first oil pressure chambers 55 and 56 and the second oil pressure chambers 57 and 59 are equipped with pre-loading springs 65 and 66 under compression for urging the primary and secondary side movable sheaves 7b and 9b toward the stationary sheaves 7a and 9a.

As shown in FIG. 1, the damper unit 12 and the oil pump 17 on the first shaft 3 are arranged to axially overlap the hydraulic actuator 9c of the secondary pulley 9 arranged on the second shaft. On the other hand, the planetary gear unit 19, the high clutch $C_H$ and the output gear 21, arranged on the second shaft between the secondary side sprocket 20 of the synchronous transmission and the stationary sheave 9a, axially overlap the hydraulic actuator 7c of the primary pulley 7 on the first shaft 3.

As shown in FIG. 2, on the other hand, in a plane transverse to their axes, the centers of the first shaft 3, the second shaft 4, the third shaft 5 and the fourth shaft 6 define a deformed quadrilateral, as seen in a side elevation, and the second shaft 4, the fourth shaft 6, the first shaft 3 and the third shaft 5 are arranged consecutively downward.

Next, operation of the continuously variable transmission 1 will be described with reference to FIGS. 1, 3 and 4. The rotation of the engine crankshaft 2 is transmitted through the damper unit 12 to the input shaft 3. In the low gear of the D-range, in which the low clutch $C_L$ is applied whereas the high clutch $C_H$ is released, the rotation of the input shaft 3 is transmitted to the primary pulley 7 and to the carrier 19c of the planetary gear unit 19 through the synchronous transmission 16 which is composed of the primary side sprocket 18, the belt or chain member 22 and the secondary side sprocket 20. The rotary speed of the primary pulley 7 is changed in accordance with the pulley ratio of the primary and secondary pulleys as adjusted by the hydraulic actuators 7c and 9c, and this speed-changed rotation is transmitted to the secondary pulley 9 and then to the sun gear 19s of the planetary gear unit 19.

Figure 3:
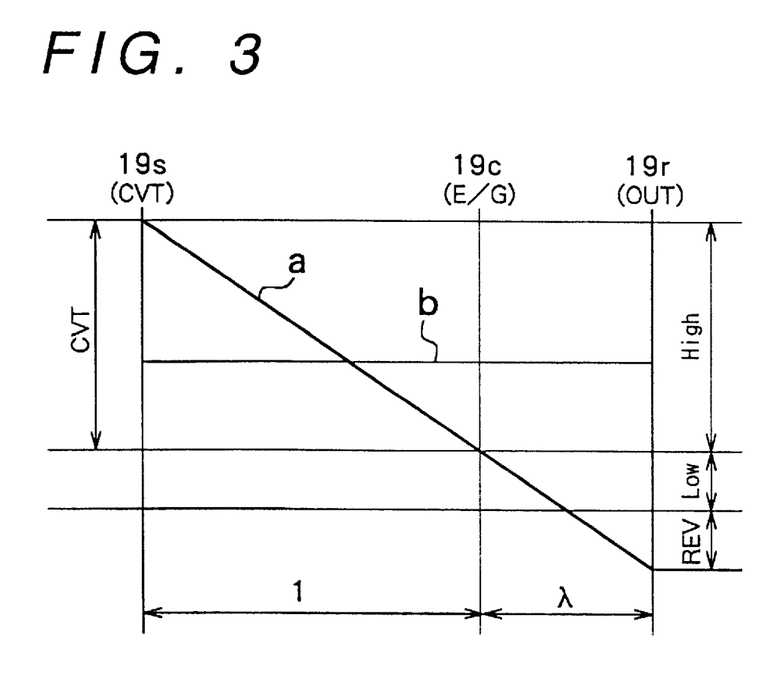
FIG. 3 is a speed diagram of operation of the embodiment of FIG. 1.

In the planetary gear unit 19, as illustrated by the speed diagram of FIG. 3, the carrier 19c receives the synchronous rotational output of the synchronous transmission 16 and acts as a reaction element in transfer of rotation from the belt type continuously variable transmission (CVT) to the sun gear 19s. The rotations of the carrier and the sun gear are integrated and transmitted to the output gear 21 through the ring gear 19r. Since, at this time, the ring gear 19r, or another rotary element other than the reaction supporting element, is connected to the output shaft 5, the planetary gear unit 19 circulates the torque, and the sun gear 19s and the carrier 19c rotate in the same direction, so that the output shaft rotates forward (Lo) and backward (Rev), with transition therebetween across zero rotation. In the belt type continuously variable transmission 11, on the basis of the torque circulation, the torque is transmitted from the secondary pulley 9 to the primary pulley 7 during forward driving (forward rotation of the output shaft 5) and from the primary pulley 7 to the secondary pulley 9 during the reverse (or backward) rotation of the output shaft.

In high gear in which the low clutch $C_L$ is released whereas the high clutch $C_H$ is connected, the transmission of torque through the synchronous transmission 16 to the planetary gear unit 19 is interrupted so that the planetary gear unit 19 is integrally rotated with the high clutch $C_H$ applied. As a result, the rotation of the input shaft 3 is transmitted to the output gear 21 exclusively through the belt type continuously variable transmission (CVT) 11 and the high clutch $C_H$, i.e. from the primary pulley 7 to the secondary pulley 9. Moreover, the rotation of the output gear 21 is transmitted through the gears 23a and 23b on the counter shaft 6 to the differential unit 25 and further through the left and right axles 5a and 5b to the left and right front wheels.

Figure 5:
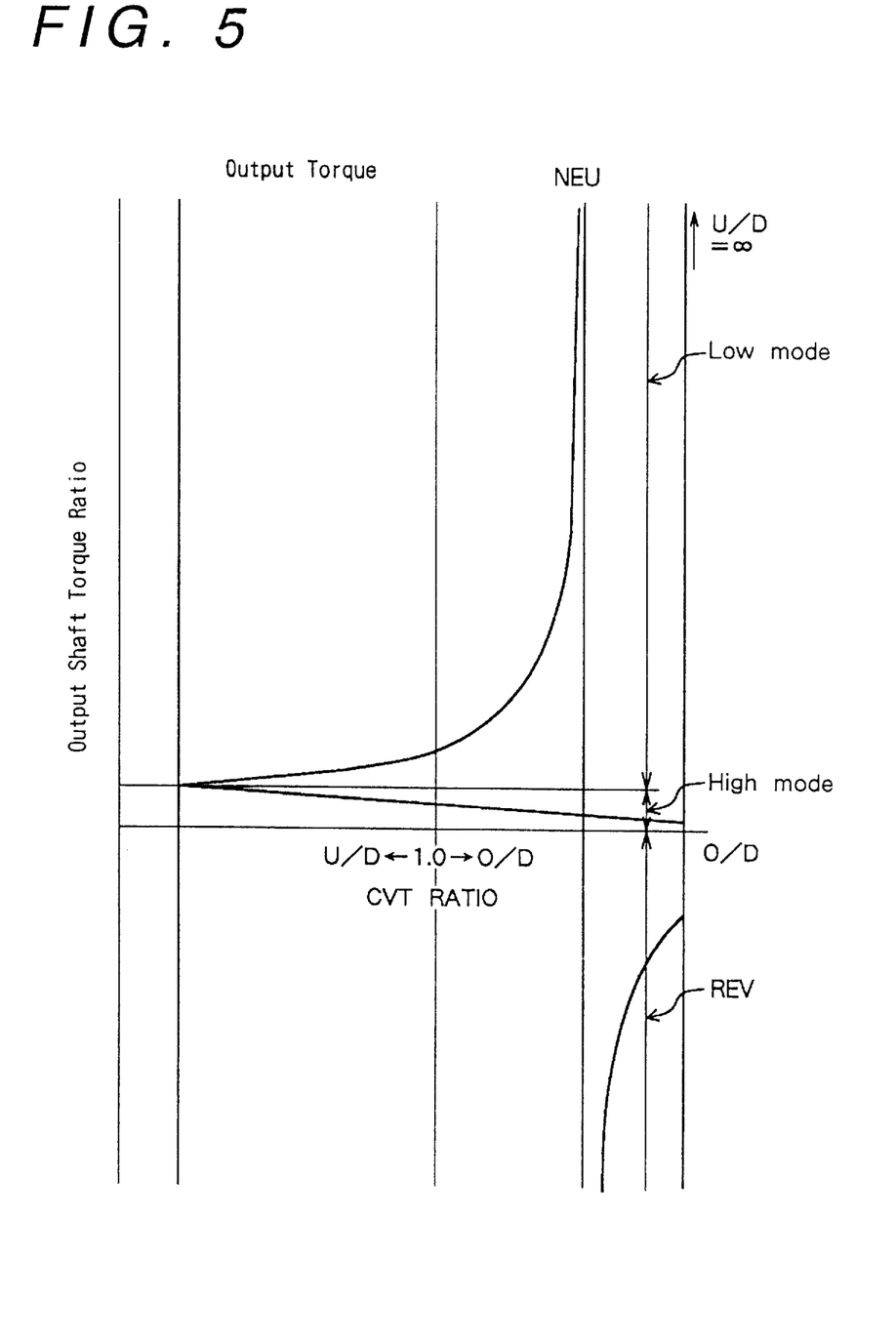
FIG. 5 is a graph of output shaft torque in relation to the torque ratio of the belt-type continuously variable transmission (CVT) subunit.
Figure 6:
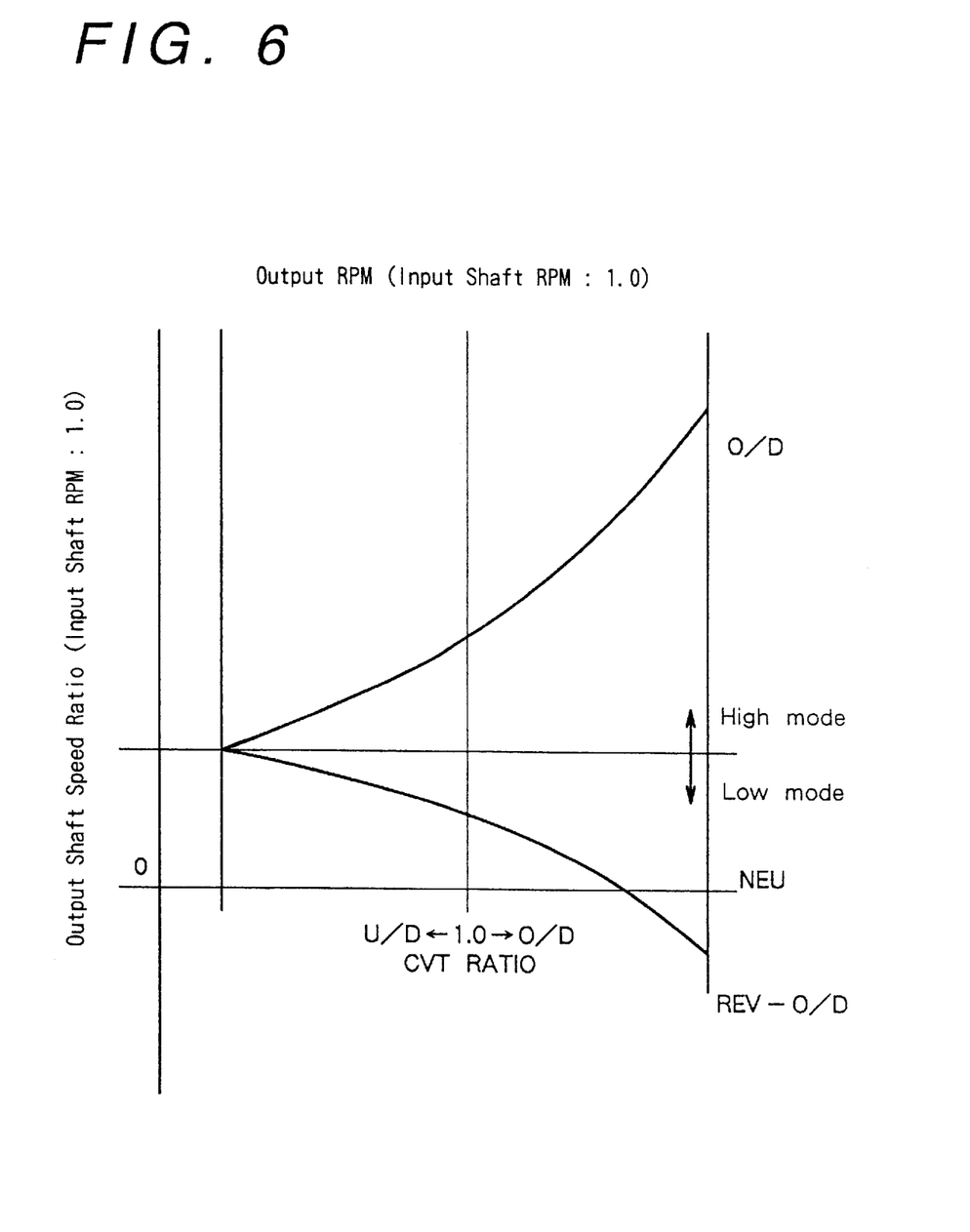
FIG. 6 is a graph of the output shaft RPM versus the torque ratio of the CVT.

In low gear, as illustrated in the speed diagram of FIG. 3, the output torque diagram of FIG. 5 and the output RPM diagram of FIG. 6, if the belt type continuously variable transmission (hereinafter "CVT") 11 is at the limit of acceleration (in O/D), as indicated by the position of line a of FIG. 2, the sun gear 19s rotates to the maximum so that the ring gear 19r rotates reverse to the direction of rotation of the carrier 19c, at a constant RPM, to transmit the reverse rotation (REV) to the output gear 21. When the CVT 11 decelerates its speed (U/D), the RPM of the reverse rotation decreases until reaching a neutral state (NEU), in which the RPM of the output gear 21 is 0, i.e. at a predetermined pulley ratio which is determined by the gear ratio between the planetary gear unit 19 and the synchronous transmission 16.

Also when the CVT 11 decelerates its speed, the rotation of the ring gear 19r is switched to the forward direction so that the driving or forward rotation is transmitted to the output gear 21. At this time, as is apparent from FIG. 5, the torque of the output gear 21 diverges to infinity in the vicinity of the neutral position NEU.

When the CVT 11 completes its deceleration (U/D), the high clutch $C_H$ is applied to switch into high gear. In high gear, the output rotation of the CVT 11 is transmitted as is to the output gear 21 as represented by horizontal line b in the speed diagram of FIG. 3. As the speed of CVT 11 is accelerated (toward O/D), the rotation of the output gear 21 is then accelerated and the transmission torque is accordingly lowered. Incidentally, "1" in FIG. 3 represents the ratio (Zs/Zr) between the number of teeth Zs of the sun gear and the number of teeth Zr of the ring gear.

Figure 4:
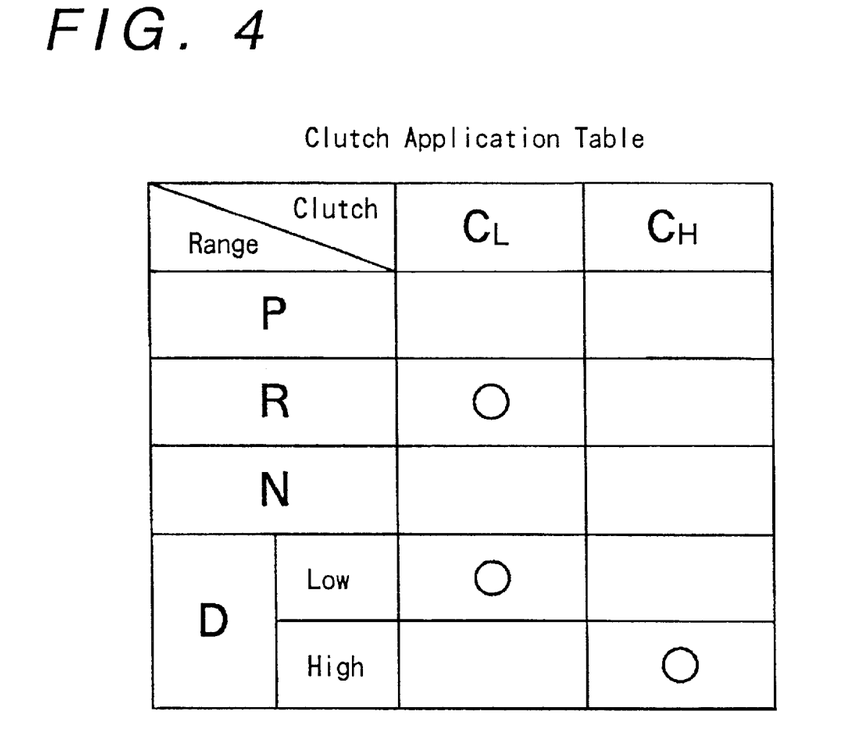
FIG. 4 is a table of the states of the clutches in the various ranges.

As shown in FIG. 4, in park (P) and in neutral (N), both the low clutch $C_L$ and the high clutch $C_H$ are released so that power from the engine is not transmitted. In park (P), the differential unit 25 is locked to lock the axles 5a and 5b.

In the low gear mode of the D-range, the oil pressure generated by the oil pump 17 is fed to the hydraulic servo for the low clutch $C_L$ to apply the low clutch $C_L$. In the CVT 11, the axial force exerted by the secondary side hydraulic actuator 9c, in which the oil pressure is received in both the first and second oil pressure chambers 56 and 59, becomes higher than that exerted by the primary side hydraulic actuator 7c, in which the oil pressure is received only within the first oil pressure chamber 55. In transmission of torque from the secondary pulley 9 to the primary pulley 7, a ratio control valve is suitably controlled to adjust the oil pressure in the second oil pressure chamber 59 of the secondary hydraulic actuator 9c so that the axial force of the hydraulic actuator 7c is suitably adjusted to change the pulley ratio (or torque ratio) as required. In this state, the engine torque transmitted from the input shaft 3, through the low clutch $C_L$ and the synchronous transmission 16 to the carrier 19c of the planetary gear 19, is extracted through the sun gear 19s, while being regulated in accordance with the pulley ratio by the CVT 11, and output through the ring gear 19r from the output gear 21.

In the high gear (H) mode of the D-range, on the other hand, the predetermined oil pressure, as produced by the oil pump 17, is fed to the first and second oil pressure chambers 55 and 57 of the primary side hydraulic actuator 7c, to the first oil pressure chamber 56 of the second side hydraulic actuator 9c and further to the hydraulic servo for the high clutch. Specifically, in the high gear mode, the D-range position is taken as in the foregoing low gear mode, and the high clutch $C_H$ is applied. In the CVT 11, moreover, the axial force exerted by the primary side hydraulic actuator 7c, which receives the oil pressure in both its first and second oil pressure chambers 55 and 57, becomes stronger than that exerted by the secondary side hydraulic actuator 9c, which receives oil pressure in only its first oil pressure chamber 56. In transmitting torque from the primary pulley 7 to the secondary pulley 9, the ratio control valve is suitably controlled to adjust the oil pressure in the second oil pressure chamber 57 of the primary hydraulic actuator 7c so that the axial force of the hydraulic actuator 7c is suitably adjusted to produce the required pulley ratio (or torque ratio). In this manner, the torque transmitted from the engine to the input shaft 3 is suitably changed by the CVT 11 and output through the high clutch $C_H$ at the output gear 21.

In reverse range (R), the predetermined oil pressure is fed to the first and second oil pressure chambers 55 and 57 of the 5 primary side hydraulic actuator 7c, to the first oil pressure chamber 56 of the secondary side hydraulic actuator 9c and further to the hydraulic servo for the low clutch. As a result, the low clutch $C_L$ is applied. In the CVT 11, moreover, the axial force exerted by the primary side hydraulic actuator 7c, which receives oil pressure in its first and second oil pressure chambers 55 and 57, becomes greater than that exerted by the secondary side hydraulic actuator 9c, which receives oil pressure in only its first oil pressure chamber 56. In transmitting torque from the primary pulley 7 to the secondary pulley 9, the ratio control valve is suitably controlled to adjust the oil pressure in the second oil pressure chamber 57 of the primary hydraulic actuator 7c so that the axial force of the hydraulic actuator 7c provides the needed pulley ratio (or torque ratio). In this state, the pulley ratio of the CVT 11 is accelerating (toward O/D), and the engine torque from the input shaft 3 is transmitted through the low clutch $C_L$ and the synchronous transmission 16 to the carrier 19c of the secondary pulley 19 and also through the CVT 11 to the secondary pulley 9 and the sun gear 19s, so that the two torques are integrated in the planetary gear unit 19 and output as reverse rotation at the output gear 21 through the ring gear 19r.

Because the transmission 1 transmits power from the engine output shaft 2 directly to the input shaft 3, with only the damper unit 12 intervening, the conventional torque converter, fluid coupling, electromagnetic clutch or other input clutch can be dispensed with. Therefore, transmission 1 requires neutral control by which it is automatically brought into neutral when the vehicle stops.

In neutral control, the axial forces of the primary pulley 7 and the secondary pulley 9 are controlled to be substantially equal. Alternatively, the difference between the axial forces on the primary and secondary pulleys is made smaller than the difference between the axial forces of the two pulleys, as determined from the input torque of the CVT and the pulley ratio at the instant when the output torque is positive, by a small value within such a range so as not to reverse the relative magnitude, or smaller than the difference between the axial forces of the primary and secondary pulleys, as determined from the input torque of the CVT and the pulley ratio at the instant when the output torque is negative, by a small value within such a range so as not to reverse the relative magnitude. Specifically, the oil pressures of the second oil pressure chambers 57 and 59 are released to equalize the axial forces on the two pulleys 7 and 9, while oil pressures are being fed to the two first oil pressure chambers 55 and 56 of the primary and secondary hydraulic actuators 7c and 9c.

Incidentally, the neutral control, i.e., where the CVT 11 self-converges into the neutral state due to a difference between the axial forces produced by the primary and secondary side hydraulic actuators 7c and 9c within the predetermined range, is disclosed in detail in Japanese Patent Application Nos. 66234/1995 and 128701/1995, the teachings of which are incorporated herein by reference.

According to the present invention, the planetary gear unit and the output gear are arranged on the second shaft, within an axial space as defined by the hydraulic actuator of the first pulley (which is relatively long in the axial direction), the synchronous transmission and the belt, so that the axial space can be effectively used to provide a compact structure, i.e., an axially compact continuously variable transmission.

Also, according to the present invention, the damper unit is arranged on the first shaft, in an axial space as defined by the hydraulic actuator of the second pulley (which is relatively long in the axial direction), the engine and the belt, and the power from the engine is transmitted directly to the first shaft (or input shaft), with saving of the axial space required for the fluid coupling or its equivalent in the prior art, to provide a compact structure, i.e., an axially compact unit.

Further, according to the present invention, the oil pump is arranged on the first shaft, in a space as defined by the hydraulic actuator of the second pulley, the belt and the damper unit, so that the axial space can be effectively used to provide an axially compact unit.

The present invention also allows the continuously variable transmission to be made more compact by a rational arrangement in which the lengths of the first shaft and the second shaft are balanced.

The hydraulic actuators of the first pulley and the second pulley each have a double-piston structure so that they can produce high axial forces, as demanded, despite their small size. At the same time, the difference between the axial forces acting on the first and second pulleys can be easily held within a predetermined range to hold compact structure in a compact structure of improved reliability.

Of the first, second and fourth shafts, the first shaft has the greater length and is arranged in the lowermost position so that it does not interfere with a reinforcing side member in the front portion of the car body, to thereby improve mountability especially for a F/F vehicle. The bearing of the end portion of the second shaft and the bearing of the output gear and the synchronous transmission are given a two-storied structure to shorten the second shaft.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A transmission unit for transmitting torque from an engine, received at an engine side of the transmission unit, to wheels of a vehicle, said transmission unit comprising:

a belt type continuously variable transmission subunit including: a first pulley arranged on a first shaft and having a first stationary sheave, a first movable sheave and a first hydraulic actuator for moving said first movable sheave; a second pulley arranged on a second shaft and having a second stationary sheave, a second movable sheave and a second hydraulic actuator for moving said second movable sheave; and a belt mounted around said first and second pulleys;

a synchronous transmission connecting a first rotary member arranged on said first shaft and a second rotary member arranged on said second shaft at a constant speed ratio, through an endless band;

an output gear for transmitting torque to wheels of the vehicle;

a planetary gear unit arranged on said second shaft and including at least first, second and third rotary elements, said first rotary element being connected to said second rotary member, said second rotary element being connected to said second pulley, and said third rotary element being connected to said output gear, and a first clutch for selectively coupling said first shaft to the first rotary member of said synchronous transmission to selectively transmit the torque, wherein said first shaft is connected through said belt type continuously variable transmission to said second rotary element and through said synchronous transmission to said first rotary element, wherein said first hydraulic actuator and said second hydraulic actuator are arranged on axially opposite sides of said belt, and wherein said planetary gear unit and said output gear are arranged to axially overlap said first hydraulic actuator and are mounted on said second shaft between said synchronous transmission and said second pulley, wherein the power from the engine is input directly to said first shaft through a damper unit for absorbing fluctuation in the torque output of the engine, and wherein said damper unit is arranged to axially overlap said second hydraulic actuator and is mounted on said first shaft at the engine side of said first stationary sheave.

2. A transmission unit according to claim 1, further comprising an oil pump driven by the torque from the engine for producing an oil pressure fed to the first and second hydraulic actuators, said oil pump being mounted on said first shaft between said damper unit and said first stationary sheave.

3. A transmission unit according to claim 1,
   wherein said first clutch includes an input member mounted on said first shaft axially outward of the side of said first rotary member opposite the engine.

4. A transmission unit according to claim 1,
   wherein said synchronous transmission includes: said first rotary member in the form of a sprocket; said second rotary member in the form of a sprocket; and a chain mounted around said two sprockets.

5. A transmission unit according to claim 1,
   wherein said first rotary element is a carrier, said second rotary element is a sun gear, and said third rotary element is a ring gear.

6. A transmission unit according to claim 5, further comprising a second clutch interposed between said sun gear and said ring gear for selectively transmitting torque, said second clutch being mounted on said second shaft between said planetary gear unit and said output gear.

7. A transmission unit according to claim 1,
   wherein said first and second hydraulic actuators each have a first oil chamber and a second oil chamber arranged coaxially in series.

8. A transmission unit according to claim 7, further comprising:
   a differential unit;
   a third shaft extending from said differential unit to form left and right front wheel axles; and
   a fourth shaft, serving as a counter shaft, interposed between said output gear and said differential unit,
   wherein lines joining the centers of said first, second, third and fourth shafts, as viewed in side elevation, form a deformed quadrilateral, and
   wherein said second shaft, said fourth shaft, said first shaft and said third shaft are arranged consecutively in the recited order from uppermost to lowermost.

9. A transmission unit according to claim 8, further comprising a casing and a boss integral with said second stationary sheave, said boss being rotatably supported by said casing through a bearing, and
   wherein said output gear is rotatably supported on the boss of said second stationary sheave through a bearing.

* * * * *

UNITED STATES PATENT AND TRADEMARK OFFICE
CERTIFICATE OF CORRECTION

PATENT NO. : 5,846,152
DATED : December 8, 1998
INVENTOR(S) : TANIGUCHI et al

It is certified that error appears in the above-indentified patent and that said Letters Patent is hereby corrected as shown below:

Col. 4, line 46, "$7a_21$" should read --$7a_2$--; and
line 62, "9a" should read --$9a_1$--.

Col. 9, line 13, delete "compact structure" and insert --the neutral state--.

Signed and Sealed this

Twenty-sixth Day of October, 1999

Attest:

Q. TODD DICKINSON

Attesting Officer    Acting Commissioner of Patents and Trademarks